(12) United States Patent
Inoue et al.

(10) Patent No.: US 6,706,360 B2
(45) Date of Patent: Mar. 16, 2004

(54) OPTICAL RECORDING MEDIUM

(75) Inventors: Hiroyasu Inoue, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 12 days.

(21) Appl. No.: 10/125,475

(22) Filed: Apr. 19, 2002

(65) Prior Publication Data

US 2003/0003260 A1 Jan. 2, 2003

(30) Foreign Application Priority Data

Apr. 20, 2001 (JP) .................................... P2001-123529

(51) Int. Cl.[7] ................................................ B32B 3/02
(52) U.S. Cl. .................... 428/64.1; 428/64.5; 428/64.6; 430/270.13
(58) Field of Search ...................... 428/64.1, 64.4, 428/64.5, 64.6, 913; 431/270.13, 495.1, 945

(56) References Cited

U.S. PATENT DOCUMENTS 5,840,466 A * 11/1998 Nonaka ................. 430/270.13
6,040,030 A * 3/2000 Utsunomiya ............... 428/64.1

FOREIGN PATENT DOCUMENTS

| JP | 63-217542 | 9/1988 |
| JP | 8-221814 | 8/1996 |
| JP | 10-226173 | 8/1998 |

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

An optical recording medium wherein a recording layer, an absorbent layer and a radiating layer are provided in this order as seen from a recording/reproducing light incidence side and recording/reproduction is carried out on a condition that an extinction coefficient k of the absorbent layer is $k>0$ in a wavelength of recording/reproducing light, and a relationship between a wavelength $\lambda$ of the recording/reproducing light and a numerical aperture NA of an irradiating optical system of the recording/reproducing light is $\lambda/NA \leq 680$ nm. An optical recording medium wherein an absorbent layer and a recording layer are provided in this order as seen from a recording/reproducing light incidence side and an extinction coefficient k of the absorbent layer is $k>0$ in a wavelength of recording/reproducing light, and a signal including a minimum mark having a mark length $M_s$ of $M_s \leq 0.17$ $\mu$m is recorded.

8 Claims, 3 Drawing Sheets

FIG. 1A
RECORDING/REPRODUCING LIGHT

FIG. 1B
RECORDING/REPRODUCING LIGHT

FIG. 1C
RECORDING/REPRODUCING LIGHT

FIG. 2
RECORDING/REPRODUCING LIGHT

OPTICAL RECORDING MEDIUM

BACKGROUND OF THE INVENTION

The present invention relates to an optical recording medium such as a phase-change optical recording medium.

In recent years, attention has been paid to an optical recording medium capable of carrying out high density recording, and furthermore, erasing and rewriting the recorded information. A rewritable phase-change optical recording medium of serves to irradiate a laser beam to change the crystal state of a recording layer, thereby carrying out recording and to detect a change in the reflectance of the recording layer with such a change in the state, thereby carrying out reproduction. Since the optical system of a driving device is simpler than that of a magneto-optical recording medium, attention has been paid to the phase-change optical recording medium.

Since a difference in a reflectance between a crystalline state and an amorphous state is great and the stability of the amorphous state is comparatively high, a chalcogenide based material such as a Ge—Sb—Te based material is often used for the phase-change recording layer.

When information is to be recorded in the phase-change optical recording medium, a laser beam having such a high power (recording power) that the temperature of the recording layer is raised to a melting point or more is irradiated. In a portion in which the recording power is applied, the recording layer is molten and is then quenched to form an amorphous recording mark. On the other hand, when the recording mark is to be erased, a laser beam having such a comparatively low power (erasing power) as to raise the recording layer to have a temperature which is equal to or higher than a crystallization temperature thereof and is less than a melting point is irradiated. The recording mark having the erasing power applied thereto is heated to the crystallization temperature or more and is then cooled slowly so that it returns to be a crystalline substance. In the phase-change optical recording medium, accordingly, the intensity of a single laser beam is modulated so that overwrite can be carried out.

In order to realize an increase in a recording density, a recording and reproducing wavelength has been shortened and the numerical aperture of the objective lens of a recording and reproducing optical system has been increased. A spot size on the surface of the recording layer of a laser beam for recording is represented by $\lambda/NA$, wherein a laser wavelength is represented by $\lambda$ and a numerical aperture is represented by NA.

The reproducing light is originally a laser beam having a lower power which does not influence the crystal state of a recording mark. When the reproduction is repetitively carried out, the recrystallization of the recording mark is generated. As a result, a jitter is increased. According to the study of the inventors, in the case in which a laser beam having a short wavelength is irradiated by an optical system including an objective lens having a great numerical aperture for high density recording, that is, the $\lambda/NA$ is small, an energy density in a laser beam spot is increased. Consequently, it has been found that the jitter is increased, that is, a reproducing durability is greatly deteriorated even if the number of repetitive reproductions is comparatively small.

When a laser beam for recording is irradiated, the temperature of an adjacent track to a recording object track is also raised. For this reason, an amorphous recording mark present on the adjacent track to the recording object track is recrystallized in some cases. Such a phenomenon will be referred to as a cross erase in this specification. When the cross erase is generated, a carrier to noise ratio (C/N) is reduced. If a recording track pitch for a laser beam spot size is smaller, the cross erase is generated more easily. According to the study of the inventors, moreover, it has been found that the cross erase is generated more easily with a higher energy density in a beam spot even if the ratio of the beam spot size to the recording track pitch is equal.

SUMMARY OF THE INVENTION

It is an object of the invention to provide an optical recording medium having an excellent reproducing durability and capable of suppressing a cross erase, and furthermore, to provide an optical recording medium having a small jitter during high density recording.

Such an object is achieved by the invention according to the following (1) to (5).

(1) An optical recording medium wherein a recording layer, an absorbent layer and a radiating layer are provided in this order as seen from a recording/reproducing light incidence side and recording/reproduction is carried out on a condition that an extinction coefficient k of the absorbent layer is k>0 in a wavelength of recording/reproducing light, and a relationship between a wavelength $\lambda$ of the recording/reproducing light and a numerical aperture NA of an irradiating optical system of the recording/reproducing light is $\lambda/NA \leq 680$ nm.

(2) The optical recording medium according to the (1), wherein a recording track pitch $P_T$ is set to $P_T \leq 0.35$ $\mu$m.

(3) The optical recording medium according to the (1) or (2), wherein an absorbent layer is provided on this side of the recording layer as seen from a recording/reproducing light incidence side and an extinction coefficient k of the absorbent layer is k>0 in a wavelength of recording/reproducing light, and a signal including a minimum mark having a mark length $M_s$ of $M_S \leq 0.17$ $\mu$m is recorded.

(4) An optical recording medium wherein an absorbent layer and a recording layer are provided in this order as seen from a recording/reproducing light incidence side and an extinction coefficient k of the absorbent layer is k>0 in a wavelength of recording/reproducing light, and a signal including a minimum mark having a mark length $M_s$ of $M_S \leq 0.17$ $\mu$m is recorded.

(5) The optical recording medium according to any one of the (1) to (4), wherein the extinction coefficient k of the absorbent layer is preferably within the range of 0.06 to 1.0.

DETAILED DESCRIPTION OF THE PREFERRED EMBODIMENT

Figure 1A:
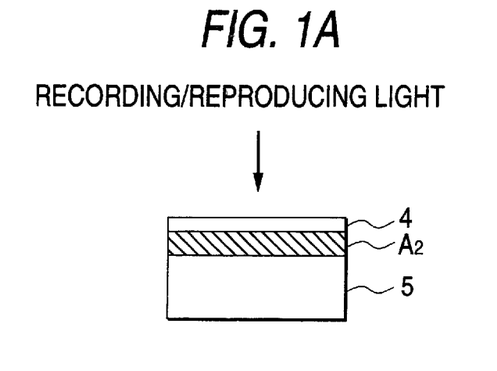
FIG. 1A is a view typically showing the layer structure of an optical recording medium according to a first embodiment of the invention.
Figure 1B:
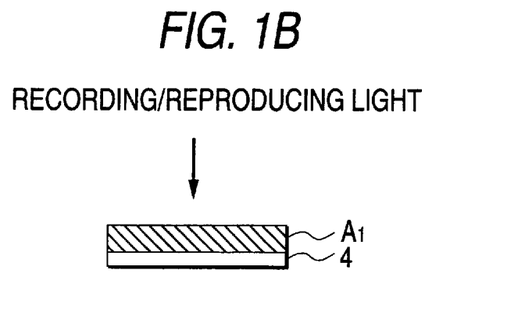
FIG. 1B is a view typically showing the layer structure of an optical recording medium according to a second embodiment of the invention.
Figure 1C:
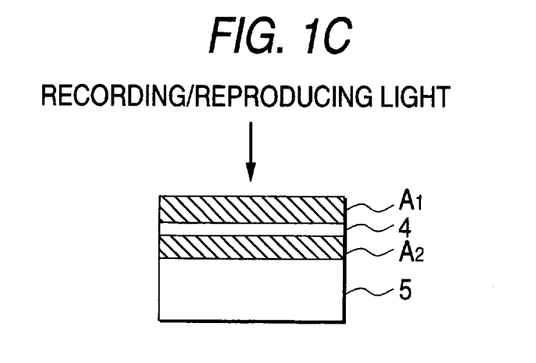
FIG. 1C is a view typically showing the layer structure of an optical recording medium according to a combination of the first embodiment and the second embodiment of the invention.

FIG. 1A typically shows the layer structure of a medium according to a first embodiment of the invention, FIG. 1B typically shows the layer structure of a medium according to a second embodiment of the invention, and FIG. 1C typically shows the layer structure of a medium according to a combination of the first embodiment and the second embodiment.

In the medium according to the first embodiment of the invention, a recording layer 4, an absorbent layer $A_2$ and a radiating layer 5 are provided in this order as seen from the recording/reproducing light incidence side. In the second embodiment of the invention, moreover, an absorbent layer $A_1$ is provided on this side of the recording layer 4 as seen from the recording/reproducing light incidence side. In this specification, the absorbent layer $A_2$ to be provided between the recording layer 4 and the radiating layer 5 will be referred to as a second absorbent layer and the absorbent layer $A_1$ to be provided on this side of the recording layer 4 will be referred to as a first absorbent layer.

When a complex refractive index is represented by n+ik, the absorbent layer in the invention has an extinction coefficient k in the wavelength of recording/reproducing light which is set to k>0. If the extinction coefficient k is 0, the effect of the invention cannot be obtained. In order to fully realize the effect of the invention, moreover, $k \geq 0.05$ is preferable. If the extinction coefficient k is too great, the absorptance of the recording/reproducing light in the absorbent layer is too increased so that recording and reproduction are hindered. Therefore, $k \leq 3$ is preferably set and $k \leq 2$ is set more preferably.

The extinction coefficient k can be calculated from the reflectance and the transmittance of the absorbent layer. More specifically, it is preferable that measurement should be carried out in the following procedure, for example. First of all, an absorbent layer having a thickness of 20 nm is formed on a slide glass and is set to be a sample A for measurement. Moreover, an absorbent layer having a thickness of 20 nm and a reflecting layer having a thickness of 100 nm are formed on the slide glass in this order and are set to be a sample B for measurement. The reflecting layer is to have a well known complex refractive index. For the samples A and B, next, a reflectance and a transmittance in the wavelength of the recording/reproducing light are measured. For the measurement, it is preferable that a 45° absolute specular reflectance measuring accessory (special model of RTA-2000) for a spectrophotometer (MPS-2000) manufactured by Shimadzu Corporation, for example, should be used. From the reflectance and the transmittance, a complex refractive index n+ik is calculated from the reflectance and the transmittance by a matrix method. It is also possible to obtain the complex refractive index by another means such as an ellipsometer.

In the first embodiment, the recording/reproducing light is transmitted through the recording layer 4 and the second absorbent layer $A_2$ and is reflected by the radiating layer 5, and is transmitted through the second absorbent layer $A_2$ and reaches the recording layer 4 again. The second absorbent layer $A_2$ absorbs a part of the recording/reproducing light and generates heat. On the other hand, the heat generation of the recording layer 4 is more suppressed as compared with the case in which the second absorbent layer $A_2$ is not provided. The second absorbent layer $A_2$ is present between the radiating layer having an excellent radiating property and the recording layer 4 and heat generated by the second absorbent layer $A_2$ is transmitted to the radiating layer 5 and is radiated quickly. Therefore, the heat generation of the second absorbent layer $A_2$ rarely influences the recording layer 4. By such a function, are producing durability can be enhanced in the first embodiment.

Moreover, the heat generated on the second absorbent layer $A_2$ is transmitted to the radiating layer 5 and is radiated quickly. Therefore, when the recording/reproducing light is irradiated on the recording layer 4, a region in which a temperature is raised to be comparatively high is restricted to a beam spot and the very vicinity thereof. For this reason, the cross erase can be reduced in the first embodiment.

The first embodiment is applied to the case in which the relationship between a wavelength λ of the recording/reproducing light and a numerical aperture NA of an irradiating optical system of the recording/reproducing light is λ/NA≦680 nm, preferably, λ/NA≦630 nm. λ/NA correlates with the spot size of a laser beam for recording/reproduction. If the λ/NA is smaller, the spot size is more reduced so that an energy density in the laser beam spot is increased. As described above, if the energy density in the laser beam spot is high, there producing durability is reduced, and furthermore, the cross erase is generated more easily. In the fist embodiment, in the case in which λ/NA is comparatively small, the reproducing durability is improved and the cross erase is decreased. However, there are limited a laser wavelength and a numerical aperture which are available. It is hard to considerably reduce the wavelength and to remarkably increase the numerical aperture. Therefore, 250 nm≦λ/NA is usually set and 350 nm≦λ/NA is preferably set.

Moreover, the cross erase is apt to be generated when a recording track pitch is small. For this reason, in the case in which λ/NA is set within the above range and a recording track pitch $P_T$ is set to $P_T \leq 0.35$ μm, particularly, $P_T \leq 0.33$ μm, the invention is particularly effective. Although the recording track pitch has no lower limit, the laser wavelength and the numerical aperture which are available are restricted as described above. Therefore, it is hard to considerably reduce the beam spot size correlating with λ/NA. Consequently, 0.14 μm≦$P_T$ is usually set and 0.15 μm≦$P_T$ is preferably set.

Next, a second embodiment will be described. In the second embodiment, a first absorbent layer $A_1$ is provided on this side of the recording layer 4 as seen from the recording/reproducing light incidence side in order to reduce a jitter.

The effect of reducing the jitter by providing the first absorbent layer $A_1$ can be realized when a minimum mark length $M_S$ of a recording signal is set to $M_S \leq 0.17$ μm. Moreover, in the case in which $M_S \leq 0.165$ μm, particularly, $M_S < 0.16$ μm, and furthermore, $M_S \leq 0.155$ μm are set, the effect of reducing the jitter can be particularly increased. Since the jitter can be reduced if the minimum mark length $M_S$ is small, the second embodiment is particularly effective for a medium in which high density recording is carried out. The reason why the effect of reducing the jitter by providing the first absorbent layer $A_1$ can be first realized when the minimum mark length $M_S$ is equal to or smaller than a constant value is not clear.

In the invention, both of the second absorbent layer $A_2$ and the first absorbent layer $A_1$ may be provided as shown in FIG. 1C. In that case, it is possible to realize both the effect of enhancing a reproducing durability and the effect of reducing a cross erase in the first embodiment and the effect of reducing a jitter in the second embodiment.

It is preferable that the thickness of the absorbent layer should be appropriately determined such that the effect of the invention can be realized fully and the optical design and thermal design of a whole medium can easily be carried out. The thickness of each of the second absorbent layer $A_2$ and the first absorbent layer $A_1$ is preferably 5 to 50 nm, and more preferably 5 to 40 nm. If the absorbent layer is too thin, the effect of the invention is insufficient. On the other hand, if the absorbent layer is too thick, the amount of light reflected from the medium is reduced. Consequently, a sufficient reproducing output is obtained with difficulty.

The component of the absorbent layer is not particularly restricted but may be appropriately selected such that the optical design and thermal design of the whole medium can easily be carried out. For example, a specific preferable material is cerium oxide or zinc oxide. Moreover, it is also possible to use a dielectric containing at least one of the materials. The absorbent layer may be constituted by a plurality of layers having different compositions. It is preferable that the absorbent layer should be formed by sputtering.

As will be described in the following example, the effect of the invention can be realized if an absorbent layer including ZnO (extinction coefficient k=0.1) is provided, while the effect of the invention cannot be realized if an absorbent layer (extinction coefficient k=0) formed by reactive sputtering in an oxygen gas containing atmosphere is provided. More specifically, even if the constitutive element of the absorbent layer is identical, the effect of the invention cannot be realized when the extinction coefficient k is slightly changed from 0.1 to 0 by a change in the ratio of the constitutive element. In order to stably realize the effect of the invention, therefore, it is necessary to strictly control and manage the extinction coefficient k of the absorbent layer. In the case in which the absorbent layer is to be formed by the sputtering, the extinction coefficient k can be controlled depending on a target composition or the flow rate of a reactive gas during the reactive sputtering.

In order to fully display the effect of the invention, it is preferable that the absorbent layer should be provided in close contact with the recording layer 4. If necessary, another layer, for example, a dielectric layer may be provided between the recording layer 4 and the absorbent layer. It is preferable that the layer should have a thickness of 30 nm or less, particularly, 20 nm or less. If another layer is too thick, the effect of the invention might be damaged.

While the invention is particularly effective for a phase-change recording medium, it can also be applied to another optical recording medium for carrying out heat mode recording, for example, a magneto-optical recording medium. In the magneto-optical recording medium, magnetizing inversion is apt to be generated by repetitive reproduction and a cross erase is apt to be caused if the λ/NA is small. In the first embodiment of the invention, they can be suppressed.

Japanese Patent Publication No. Hei. 63-217542 has described an optical information recording member in which a transparent heat-resistant protective layer is provided on both sides of a recording layer and a second heat-resistant protective layer indicating absorption in the wavelength of a laser beam used for recording and erasure is provided between the recording layer and the transparent heat-resistant protective layer. The second heat-resistant protective layer in the publication is similar to the absorbent layer in the invention in that it indicates the absorption in the wavelength of recording light. However, the invention described in the publication is different from the invention in respect of the following explanation.

The column of the function of the publication has described that a protective layer having a light absorbance is used so that the thickness of a light absorbent layer (a recording layer and a protective layer) becomes greater than that of the conventional art to increase a heat capacity, and therefore, a temperature distribution in the direction of a track width in a recording track groove (groove) can be made uniform. More specifically, in the invention described in the publication, a region in which a temperature is raised by recording light irradiation is expanded in the direction of the recording track width and a peak temperature in the center of the recording track is reduced as shown in a curve 10 of FIG. 2 in the publication. From the description of the publication, accordingly, it is anticipated that a cross erase is not reduced but deteriorated if the protective layer having light absorption is provided.

However, the inventors made experiments by using recording/reproducing light having a small beam spot size. On the contrary to expectations, the effect of reducing a cross erase was obtained as described above. The invention described in the publication is different from the first embodiment of the invention in that a radiating layer having an excellent radiating property is not provided. In the invention described in the publication, it is supposed that the radiating layer is not provided so that heat generated in the light absorbent protective layer is stored, resulting in the expansion of the temperature raising region of the recording layer in the direction of the recording track width. In the example of the publication, moreover, recording is carried out by a laser beam having a wavelength of 830 nm and a beam spot size is greater than that of the first embodiment of the invention. Therefore, an energy density in a beam spot is comparatively reduced. In the publication, therefore, it is supposed that there is no particular problem in respect of the cross erase and the reproducing durability.

In the invention described in the publication, furthermore, a protective layer having a light absorbance is provided on this side of a recording layer as seen from the recording/reproducing light incidence side in the same manner as in the second embodiment of the invention. In the publication, a minimum mark length has not been described. The wavelength of a laser beam used in the publication is remarkably long, that is, 830 nm. Therefore, the minimum mark length in the publication should be much longer than a minimum mark length limited in the second embodiment of the invention. In the publication, accordingly, the effect of reducing a jitter according to the second embodiment of the invention cannot be realized.

With reference to the drawings, description will be given to a specific example of a structure in the case in which the invention is applied to a phase-change optical recording medium.

Figure 2:
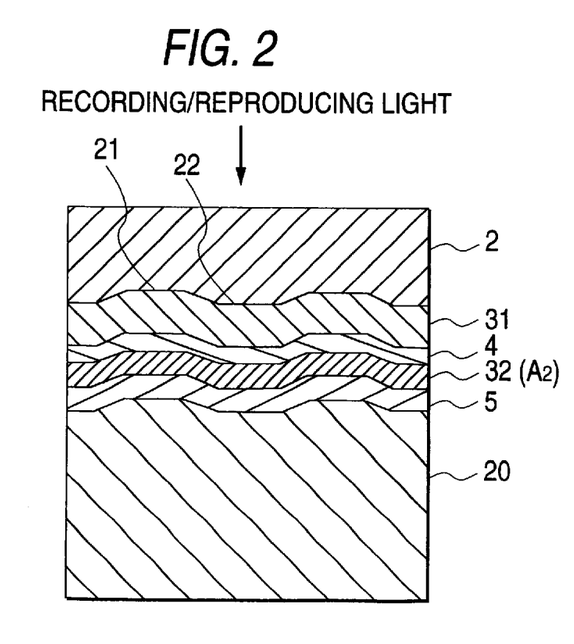
FIG. 2 is a partially sectional view showing an example of the structure of the optical recording medium according to the invention.
Figure 3:
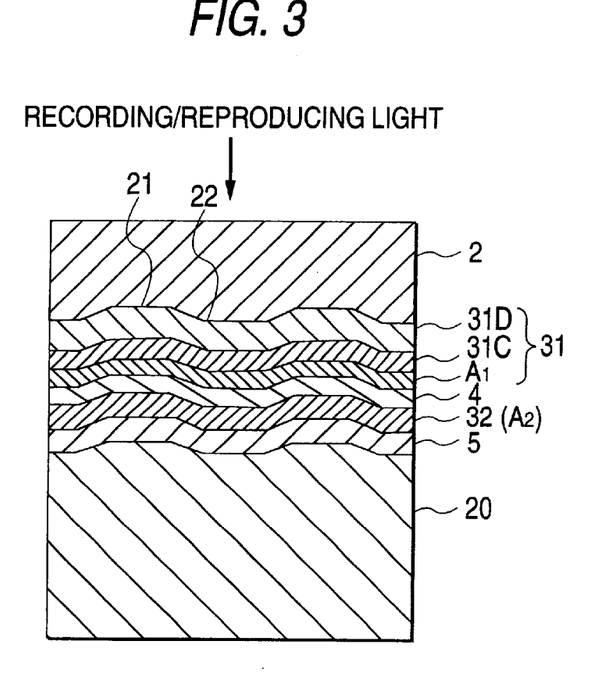
FIG. 3 is a partially sectional view showing an example of the structure of the optical recording medium according to the invention.

Structure Shown in FIGS. 2 and 3

Examples of the structure of the optical recording medium according to the invention is shown in FIGS. 2 and 3, respectively. In these optical recording media, a radiating layer 5 formed of metal or semimetal, a second dielectric layer 32, a recording layer 4 of a phase-change type, a first dielectric layer 31 and a transparent/translucent substrate 2 are provided on a support substrate 20 in this order. Recording light and reproducing light are incident through the transparent/translucent substrate 2. An intermediate layer formed of a dielectric material may be provided between the support substrate 20 and the radiating layer 5.

Support Substrate 20

The support substrate 20 is provided to maintain the rigidity of a medium. It is preferable that the support substrate 20 should usually have a thickness of 0.2 to 1.2 mm, preferably, 0.4 to 1.2 mm, and may be transparent or opaque. The support substrate 20 may be constituted by the same resin as that of an ordinary optical recording medium or by glass. A groove (guide groove) 21 provided normally in the optical recording medium can be formed by transferring a groove provided on the support substrate 20 on each layer provided thereon as shown. The groove 21 is a region which is relatively present on this side as seen from the recording and reproducing light incidence side and a region present between the adjacent grooves is a land 22.

Radiating Layer 5

The component of the radiating layer is not particularly restricted but may be usually constituted by a single metal or semimetal body such as Al, Au, Ag, Pt, Cu, Ni, Cr, Ti or Si, or an alloy including at least one of them. Since a sufficient corrosion resistance cannot be obtained by a single body of Ag or Al, it is preferable that an element for enhancing the corrosion resistance should be added. In the media having the structures shown in FIGS. 2. and 3, moreover, the surface roughness of the radiating layer on the laser beam incidence side is apt to be increased due to a crystal growth during the formation of the radiating layer. When the surface roughness is increased, are producing noise is increased. For this reason, it is preferable that the crystal grain size of the radiating layer should be reduced. Consequently, it is preferable that an additive element should be added in place of the single body of Ag or Al in order to reduce the crystal grain size of the radiating layer or to form the radiating layer as an amorphous layer.

When another element is added, a thermal conductivity is reduced. In order to reduce a cross erase and to enhance a reproducing durability, it is preferable that the recording layer 4 and the second absorbent layer $A_2$ which have temperatures raised by recording/reproducing light irradiation should be cooled quickly. Therefore, it is preferable that Ag having a higher thermal conductivity should be used as a principal component element for the radiating layer. A secondary component element which is preferably added to Ag is at least one selected from Mg, Pd, Ce, Cu, Ge, La, S, Sb, Si, Te and Zr, for example. It is preferable that at least one, preferably, two of these secondary component elements or more should be used. The content of the secondary component element in the radiating layer is preferably 0.05 to 2.0 atomic % and more preferably 0.2 to 1.0 atomic % for each element and is preferably 0.2 to 5 atomic % and more preferably 0.5 to 3 atomic % for the whole secondary component. If the content of the secondary component element is too small, the effect is insufficiently obtained by containing them. On the other hand, if the content of the secondary component element is too large, the thermal conductivity is reduced.

The thermal conductivity of the radiating layer constituted by metal or semimetal is decreased when the crystal grain size is reduced. Therefore, if the radiating layer is amorphous, a sufficient cooling speed is obtained with difficulty during recording. For this reason, preferably, the radiating layer is first formed as an amorphous layer and is then heat treated to be crystallized. When the radiating layer is formed as the amorphous layer and is then crystallized, the surface roughness of an amorphous substance can be almost maintained. In addition, the thermal conductivity can be enhanced by the crystallization.

It is preferable that the radiating layer constituted by metal or semimetal should usually have a thickness of 10 to 300 nm. When the thickness is less than the range, a sufficient reflectance is obtained with difficulty. Moreover, even if the thickness exceeds the range, the reflectance is less enhanced so that disadvantages are produced in respect of cost. It is preferable that the radiating layer should be formed by a vapor-phase growth method such as sputtering or vapor deposition.

It is preferable that the radiating layer should be constituted by metal or semimetal in the medium having the structure shown in FIG. 2 or 3. In the invention, the radiating layer may be constituted by another material. For example, if a radiating layer made of metal is formed for each recording layer in a multilayer recording medium having a plurality of recording layers and provided with a recording layer on which recording/reproducing light is irradiated through the other recording layers, the transmittance of the recording/reproducing light is remarkably reduced by the radiating layer. In the multilayer recording medium, a comparatively thick resin layer is often provided between the recording layers in order to reduce a crosstalk between the adjacent recording layers. In the case in which the invention is applied to such a multilayer recording medium, the resin layer has a large heat capacity and can be therefore utilized for the radiating layer in the invention.

First Dielectric Layer 31 and Second Dielectric Layer 32

These dielectric layers prevent the oxidation and alteration of the recording layer, and furthermore, blocks heat transmitted from the recording layer or causes the heat to go away in an in-plane direction during recording, thereby protecting the support substrate 20 and the transparent/translucent substrate 2. Moreover, the degree of modulation can be enhanced by providing the dielectric layers. The first dielectric layer 31 and the second dielectric layer 32 may be obtained by providing two unit dielectric layers or more which have different compositions.

It is preferable that the dielectric to be used for the dielectric layers should be various compounds containing at least one metal component selected from Si, Ge, Zn, Al and rare earth elements, for example. Oxide, nitride or sulfide is preferable for the compound and a mixture containing two of the compounds or more can also be used.

In the first embodiment, the whole second dielectric layer 32 may be utilized for the second absorbent layer $A_2$ as shown in FIG. 2 or the second dielectric layer 32 may be constituted by a plurality of unit dielectric layers and at least one of the unit dielectric layers may be the second absorbent layer $A_2$. In the latter case, it is preferable that each of the dielectric layers other than the second absorbent layer $A_2$ should have a thermal conductivity which is equal to or greater than that of the second absorbent layer $A_2$.

Moreover, while the whole first dielectric layer 31 may be utilized for the first absorbent layer $A_1$ in the second embodiment, the amount of light reflected from the medium is reduced so that a sufficient reproducing output is obtained with difficulty if the first absorbent layer $A_1$ is too thick. Therefore, it is preferable that the thickness of the first absorbent layer $A_1$ should not exceed 50 nm as described above. Accordingly, it is preferable that the first dielectric layer 31 should usually be constituted by a plurality of unit dielectric layers and at least one of the unit dielectric layers should be the first absorbent layer $A_1$ as shown in FIG. 3.

While the thicknesses of the first dielectric layer and the second dielectric layer may be appropriately determined to fully obtain the protecting effect and the effect of enhancing the degree of modulation, the thickness of the first dielectric layer 31 is preferably 30 to 300 nm and more preferably 50 to 250 nm and the thickness of the second dielectric layer 32 is preferably 5 to 50 nm. In order to obtain a quenching structure, the thickness of the second dielectric layer is preferably 30 nm or less and more preferably 25 nm or less.

It is preferable that each dielectric layer should be formed by sputtering.

Recording Layer 4

The composition of the recording layer is not particularly restricted but may be appropriately selected from various phase-change materials and preferably contain at least Sb and Te. A recording layer consisting of Sb and Te has a crystallization temperature of approximately 130° C. and has an insufficient preservation reliability. Therefore, it is preferable that other elements should be added to enhance the crystallization temperature. In this case, it is preferable that the element to be added should be at least one selected from In, Ag, Au, Bi, Se, Al, P, Ge, H, Si, C, V, W, Ta, Zn, Ti, Sn, Pb, Pd and rare earth elements (Sc, Y and lanthanoids) At least one selected from the rare earth elements, Ag, In and Ge is preferable because the effect of enhancing the preservation reliability is particularly high.

The following composition containing Sb and Te is preferable. When elements excluding Sb and Te are represented by M and the atomic ratio of a recording layer constituting element is expressed in Formula I: $(Sb_xTe_{1-x})_{1-y}M_y$, it is preferable to set $0.2 \leq x \leq 0.9$ $0 \leq y \leq 0.4$ and more preferable to set $0.5 \leq x \leq 0.85$ $0.01 \leq y \leq 0.2$.

If x representing the content of Sb is too small in the formula I, a crystallization speed is reduced. Therefore, it is hard to erase a recording mark at a comparatively high linear velocity. Moreover, since a reflectance in the crystalline region of the recording layer is reduced, a reproducing signal output becomes low. Furthermore, if x is remarkably small, it is also hard to carry out recording. On the other hand, if x is too great, a difference in a reflectance between a crystalline state and an amorphous state is reduced so that the reproducing signal output becomes low.

The element M is not particularly restricted but it is preferable that at least one kind should be selected from the elements which produce the effect of enhancing the preservation reliability. If y representing the content of the element M is too great, the reproducing output is apt to be reduced.

The thickness of the recording layer is preferably more than 4 nm and is equal to and less than 50 nm, and more preferably 5 to 30 nm. If the recording layer is too thin, it is hard to carry out the growth of a crystal phase so that it is difficult to perform crystallization. On the other hand, the recording layer is too thick, the heat capacity of the recording layer is increased so that it is hard to perform the recording, and furthermore, the reproducing signal output is also reduced.

It is preferable that the recording layer should be formed by sputtering.

In the invention, the structure of the recording layer is not particularly restricted. For example, the invention can also be applied to a medium including a recording layer having a multilayer structure described in Japanese Patent Publication No. Hei. 8-221814 and Japanese Patent Publication No. Hei. 10-226173, for example.

Transparent/Translucent Substrate 2

The transparent/translucent substrate 2 has a transparent/translucent property to transmit the recording and reproducing light. It is also possible to use, for the transparent/translucent substrate 2, a resin plate or glass plate having a thickness which is almost equal to that of the support substrate 20. The invention is particularly effective for the case in which high density recording is to be carried out. In order to achieve a high recording density by an increase in the NA of a recording and reproducing optical system, accordingly, it is preferable that the thickness of the transparent/translucent substrate 2 should be reduced. In this case, it is preferable that the thickness of the transparent/translucent substrate should be selected from a range of 30 to 300 μm. If the transparent/translucent substrate is too thin, the optical influence of dust sticking to the surface of the transparent/translucent substrate is increased. On the other hand, if the transparent/translucent substrate is too thick, it is hard to achieve a high recording density by an increase in the NA.

When the thickness of the transparent/translucent substrate 2 is to be reduced, it is preferable that a light transmitting sheet formed of a transparent/translucent resin should be stuck onto the first dielectric layer 31 with various adhesives or binders to be a transparent/translucent substrate or the transparent/translucent resin layer should be directly formed on the first dielectric layer 31 by utilizing coating to be the transparent/translucent substrate, for example.

In the invention, it is possible to utilize a land and/or a groove as a recording track.

Figure 4:
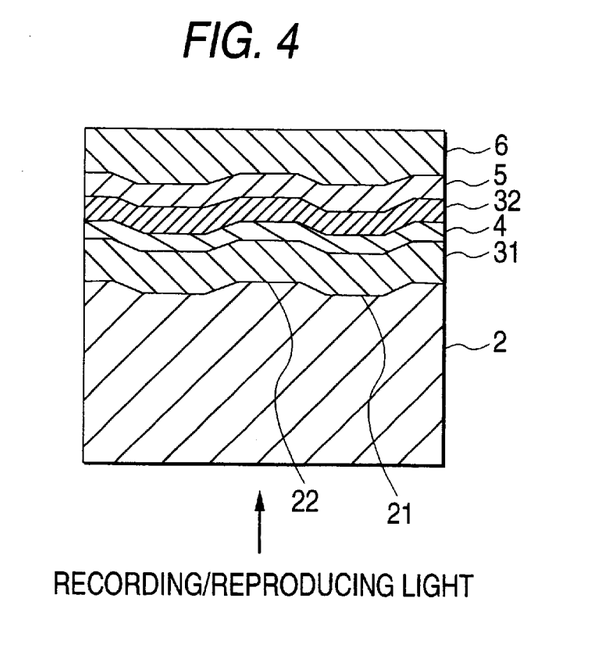
FIG. 4 is a partially sectional view showing an example of the structure of the optical recording medium according to the invention.

Structure Shown in FIG. 4

An optical recording medium shown in FIG. 4 has a first dielectric layer 31, a recording layer 4, a second dielectric layer 32, a radiating layer 5 and a protective layer 6 provided on a transparent/translucent substrate 2 in this order, and recording light and reproducing light are incident through the transparent/translucent substrate 2.

While it is preferable that the transparent/translucent substrate 2 in FIG. 4 should be similar to the support substrate 20 in FIG. 2, it is necessary to have a transparent/translucent property.

The protective layer 6 is provided to enhance an abrasion resistance and a corrosion resistance. It is preferable that the protective layer should be constituted by various organic materials, and particularly, a material obtained by curing a radiation curing type compound or a composition thereof with radiations such as an electron beam or ultraviolet rays. The protective layer usually has a thickness of approximately 0.1 to 100 μm and is preferably formed by an ordinary method such as spin coating, gravure coating, spray coating or dipping.

Each of other layers is the same as that in the example of the structure shown in FIG. 2.

EXAMPLE

First Example First Embodiment

Optical recording disc samples shown in Table 1-1 were fabricated in the following procedure. These samples have the structure shown in FIG. 2.

Disc-shaped polycarbonate having a diameter of 120 mm and a thickness of 1.2 mm which was provided with a groove simultaneously by injection molding was used for the support substrate 20. The depth of the groove was set to $\lambda/6$ (wavelength $\lambda$=405 nm) in an optical path length. Moreover, a recording track pitch in a land and groove recording method was set to 0.3 $\mu$m.

A radiating layer 5 was formed by sputtering in an Ar atmosphere. $Ag_{98}Pd_1Cu_1$ was used for a target. The thickness of the radiating layer was set to 100 nm.

The second dielectric layer 32 was set to have a thickness of 12 nm and was formed by the sputtering. The second dielectric layer 32 has a composition and an extinction coefficient k which are shown in the Table 1-1. The second dielectric layer set to k>0 functions as a second absorbent layer $A_2$. A complex refractive index in the composition shown in the Table 1-1 is as follows:

$CeO_2$: 2.7+0.1$i$;

ZnO: 2.3+0.1$i$;

and $Al_2O_3$: 1.76+0$i$.

The complex refractive index of each absorbent layer was measured in the above-mentioned procedure by using the 45° absolute specular reflectance measuring accessory (special model of RTA-2000) for the spectrophotometer (MPS-2000) manufactured by the Shimadzu Corporation.

A recording layer 4 was formed by using an alloy target through the sputtering in the Ar atmosphere. The composition (atomic ratio) of the recording layer was set to Formula I $(Sb_xTe_{1-x})_{1-y}M_y$, x=0.796, y=0.07, M=In, Ge, and In:Ge=1:6.

The thickness of the recording layer was set to 12 nm.

A first dielectric layer 31 was formed by using a ZnS (80 mol %)–$SiO_2$ (20 mol %) target through the sputtering in the Ar atmosphere. The thickness of the first dielectric layer was set to 50 nm.

A transparent/translucent substrate 2 was formed by spin coating and curing an ultraviolet curing type resin over the surface of the first dielectric layer 31.

Evaluation

After the recording layer of each sample was initialized (crystallized) by a bulk eraser, it was mounted on an optical recording medium evaluation device.

Laser wavelength $\lambda$: 405 nm,

Numerical aperture NA: 0.85,

Recording linear velocity V: 6.5 m/s, and

Recording signal: (1–7)RLL (minimum mark length of 0.173 $\mu$m).

On the above-mentioned condition, a cross erase was measured in the following procedure. $\lambda$/NA is set to 476 nm under the above-mentioned condition.

First of all, an 8T signal was overwritten to a measuring object track ten times and a carrier output thereof was defined as C1. Subsequently, a 7T signal was overwritten 100 times to tracks on both sides adjacent to the measuring object track. Next, a carrier output was measured again for the 8T signal recorded first on the measuring object track and was defined as C2. C2–C1 represents a cross erase. A recording power and an erasing power for the overwrite to the measuring object track were set to have an optimum value in each sample (by which a minimum jitter is obtained). On the other hand, the recording power and the erasing power for the overwrite to the tracks on both sides adjacent to the measuring object track were set to have a value which is more than the optimum value in each sample by 30%. A cross erase ($XE_{+30}$) on the measuring condition is shown in the Table 1-1. Under the measuring condition, the cross erase is greater than that obtained when the recording power and the erasing power have the optimum values. The Table 1-1 indicates a cross erase obtained when a groove (G) is set to be the measuring object track and a cross erase obtained when a land (L) is set to be the measuring object track.

Next, a reproducing durability was evaluated for the sample. First of all, a mixing signal was recorded onto the measuring object track (groove) at an optimum recording power on the above-mentioned conditions in the same manner as the measurement of the cross erase and reproduction was repetitively carried out at a power of 0.5 mW to examine the number of times of maximum reproduction at which the jitter is not deteriorated.

TABLE 1-1

| Sample No. | Second Absorbent Layer $A_2$ Composition | k | $XE_{+30}$ (dB) G | $XE_{+30}$ (dB) L | Reproducing Durability (number of times) |
|---|---|---|---|---|---|
| 101 | $CeO_2$ | 0.1 | –2.6 | –0.8 | 1800 |
| 102 | ZnO | 0.1 | –3.7 | –2.0 | 1600 |
| 103 (compare) | $Al_2O_3$ | 0 | –4.6 | –3.0 | 800 |

From the Table 1-1, the effect of the invention is apparent. More specifically, a cross erase is smaller in samples No. 101 and No. 102 in which the second dielectric layer 32 is set to be the second absorbent layer $A_2$ than that in a sample No. 103 in which the second dielectric layer 32 does not function as an absorbent layer, and furthermore, has an excellent reproducing durability.

Next, the cross erase was measured by using a sample including a second dielectric layer having an extinction coefficient k varied. Consequently, a result shown in the following Table 1-2 was obtained. The structure of the sample, an evaluation device and an evaluation method were set to be the same as those in the example 1 and a substrate for groove recording (a track pitch of 0.32 $\mu$m and a groove depth of 22 nm) was used.

TABLE 1-2

| Sample No. | Second Absorbent Layer $A_2$ Composition | n | k | $XE_{+30}$ (db) | Reproducing Durability (number of times) |
|---|---|---|---|---|---|
| 111 (compare) | AlN | 2.1 | 0 | –1.3 | 1000 |
| 112 | $CeO_2$ + $Al_2O_3$ | 2.4 | 0.06 | –1.0 | 1700 |
| 113 | $CeO_2$ | 2.4 | 0.1 | –0.7 | 1800 |
| 114 | AlN | 2.1 | 0.6 | –0.4 | 2300 |
| 115 | AlN | 2.1 | 1.2 |  | *1 |
| 116 | ZnO | 2.3 | 0.1 | –0.9 | 1600 |
| 117 | SiN | 2.2 | 0.12 | –0.8 | 1700 |

TABLE 1-2-continued

| Sample No. | Second Absorbent Layer $A_2$ Composition | n | k | $XE_{+30}$ (db) | Reproducing Durability (number of times) |
|---|---|---|---|---|---|
| 118 | $Ta_2O_5$ | 2.35 | 0.01 | −1.3 | 1100 |
| 119 | $Ta_2O_5$ | 2.35 | 0.1 | −0.8 | 1700 |
| 120 | $Ta_2O_5$ | 2.35 | 0.28 | −0.6 | 2100 |

*1: Reproducing output is small and reproduction is hard

AlN was formed by reactive sputtering of Ar and $N_2$ and the ratio of Ar and $N_2$ was changed to form a film having an extinction coefficient k varied. $Ta_2O_5$ film having an extinction coefficient k varied was formed by using $Ta_2O_3$ as a target and by changing the ratio of Ar and $O_2$. Incidentally, n represents a refractive index. Usually, when the cross erase exceeds −1.0 (dB), a recording characteristic is adversely affected. As described above, moreover, if the extinction coefficient k is too great, a reproducing output is reduced so that reproduction is hard to perform. From the foregoing, it can be supposed that the preferable range of the extinction coefficient k is set to $0.06 \leq k \leq 1.0$.

Second Example (Second Embodiment, First Embodiment+Second Embodiment)

Optical recording disc samples shown in Table 2-1 were fabricated in the following procedure. These samples have the structure shown in FIG. 3.

A support substrate 20 and a radiating layer 5 were set to be identical to those in the first example.

A second dielectric layer 32 was set to have a thickness of 12 nm and was formed by sputtering. The second dielectric layer 32 has a composition and an extinction coefficient k which are shown in the Table 2-1. The second dielectric layer set to k>0 functions as a second absorbent layer $A_2$. A second dielectric layer comprising ZnO was formed by using a ZnO target through the sputtering in an Ar gas atmosphere, while a second dielectric layer comprising ZnO+O was formed by using a ZnO target through reactive sputtering in the Ar gas atmosphere containing an oxygen gas. A complex refractive index of ZnO+O in the example is set to ZnO+O: 2.2+0i.

A recording layer 4 was set to be the same as that in the first example.

A first absorbent layer $A_1$ in a first dielectric layer 31 was set to have a thickness of 10 nm. The first absorbent layer $A_1$ has a composition and an extinction coefficient k shown in the Table 2-1. For comparison, a sample having a dielectric layer set to k=0 was also fabricated in place of the first absorbent layer $A_1$. A unit dielectric layer 31C in the first dielectric layer 31 was set to have a thickness of 25 nm and was constituted by ZnS (80 mol %)–$SiO_2$ (20 mol %). A unit dielectric layer 31D in the first dielectric layer 31 was set to have a thickness of 60 nm and was constituted by $Al_2O_3$.

A transparent/translucent substrate 2 was set to be the same as that in the first example.

Evaluation

After the recording layer of each sample was initialized (crystallized) by a bulk eraser, it was mounted on an optical recording medium evaluation device.

Laser wavelength λ: 405 nm,

Numerical aperture NA: 0.85,

Recording linear velocity V: 6.5 m/s, and

Recording signal: (1–7)RLL.

Figure 5:
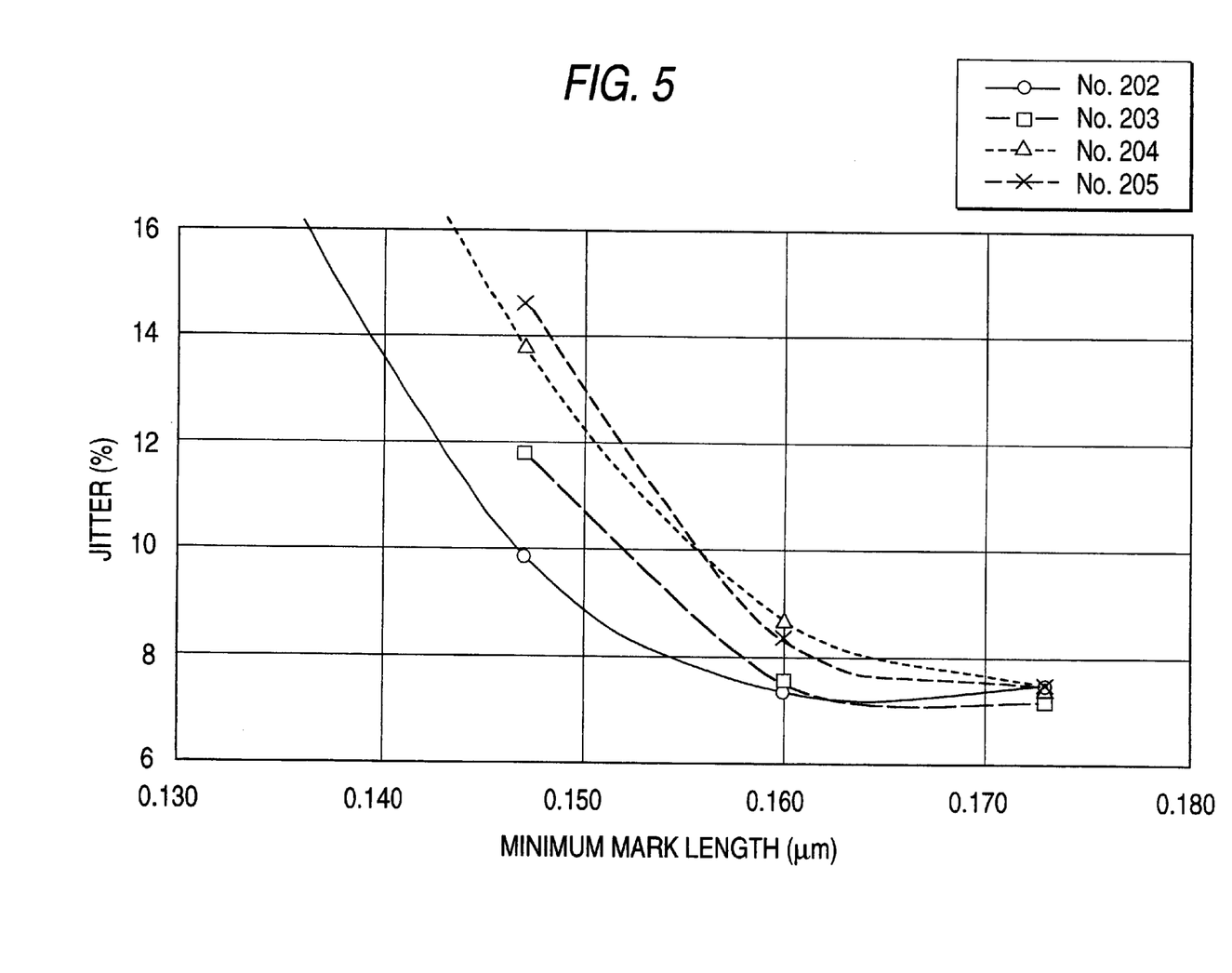
FIG. 5 is a graph showing the relationship between a minimum mark length and a jitter.

On the above-mentioned condition, a jitter was measured. In the measurement, a clock frequency was controlled such that a minimum mark length $M_S$ is set to have a value shown in the Table 2-1. The jitter is a clock jitter and has a value obtained by measuring a reproducing signal by means of a time interval analyzer to obtain "a fluctuation (σ) of the signal" and calculating σ/TW (%) with a detection window width Tw. A result is shown in the Table 2-1. Moreover, the result of a part of samples is shown in FIG. 5. If the jitter is equal to or less than 13%, an error is set within an allowable range. In order to fully maintain various margins, moreover, it is preferable that the jitter should be 10% or less.

TABLE 2-1

| | Second Absorbent Layer $A_2$ | | First Absorbent Layer $A_1$ | | Jitter (%) | | |
|---|---|---|---|---|---|---|---|
| Sample No. | composition | k | composition | k | $M_s =$ 0.173 μm | $M_s =$ 0.160 μm | $M_s =$ 0.147 μm |
| 201 | $Al_2O_3$ | 0 | $CeO_2$ | 0.1 | 7.3 | 8.2 | 12.9 |
| 202 | $CeO_2$ | 0.1 | $CeO_2$ | 0.1 | 7.3 | 7.7 | 9.8 |
| 203 | ZnO | 0.1 | ZnO | 0.1 | 7.1 | 7.5 | 11.8 |
| 204 (compare) | $Al_2O_3$ | 0 | $Al_2O_3$ | 0 | 7.4 | 8.6 | 13.8 |
| 205 (compare) | ZnO + O | 0 | ZnO + O | 0 | 7.3 | 8.4 | 14.6 |

From the Table 2-1 and FIG. 5, the effect of the invention is apparent.

The absorbent layer including ZnO is provided so that the effect of the invention can be realized. On the other hand, the effect of the invention cannot be realized in the sample in which oxygen is excessively added to ZnO to reduce the extinction coefficient k. Therefore, it is apparent that the effect of the invention is not produced depending on the constitutive element of the absorbent layer.

Furthermore, a carrier to noise ration (C/N) was measured by using a sample including the first absorbent layer $A_1$ having an extinction coefficient k varied. Consequently, a result shown in the following Table 2-2 was obtained. At the present time, a sample having the same structure as that in the second example was used except that the unit dielectric layer 31C in the first dielectric layer 31 constituted by ZnS (80 mol %)–$SiO_2$ (20 mol %) was set to have a thickness of 30 nm. An evaluation device and an evaluation method were set to be the same as those in the second example and a substrate for groove recording (a track pitch of 0.32 μm and a groove depth of 22 nm) was used.

Moreover, Table 2-3 indicates a result obtained by measuring the C/N in the case in which $CeO_2$ is used for the second absorbent layer $A_2$.

TABLE 2-2

| Sample No. | Second Absorbent Layer $A_2$ composition | n | k | First Absorbent Layer $A_1$ composition | n | k | C/N (dB) $M_s = 0.173$ μm | $M_s = 0.160$ μm | $M_s = 0.147$ μm | $M_s = 0.138$ μm |
|---|---|---|---|---|---|---|---|---|---|---|
| 211 (compare) | AlN | 2.1 | 0 | AlN | 2.1 | 0 | 50.5 | 46.9 | 38.0 | 31.0 |
| 212 | AlN | 2.1 | 0 | AlN | 2.1 | 0.1 | 50.3 | 47.0 | 41.7 | 35.1 |
| 213 | AlN | 2.1 | 0 | AlN | 2.1 | 0.6 | 50.5 | 47.5 | 42.4 | 36.5 |
| 214 | AlN | 2.1 | 0 | AlN | 2.1 | 1.2 | *2 | | | |
| 215 | $Al_2O_3$ | 1.68 | 0 | ZnO | 2.3 | 0.1 | 50.3 | 46.5 | 41.5 | 35.0 |
| 216 | $Al_2O_3$ | 1.68 | 0 | SiN | 2.2 | 0.12 | 50.4 | 46.7 | 42.1 | 35.1 |
| 217 (compare) | $Al_2O_3$ | 1.68 | 0 | $Ta_2O_5$ | 2.35 | 0.01 | 50.1 | 46.3 | 37.8 | 30.8 |
| 218 | $Al_2O_3$ | 1.68 | 0 | $Ta_2O_5$ | 2.35 | 0.1 | 50.3 | 47.0 | 41.5 | 35.3 |
| 219 | $Al_2O_3$ | 1.68 | 0 | $Ta_2O_5$ | 2.35 | 0.28 | 50.1 | 47.3 | 41.7 | 35.4 |

*2: Reproducing output is small and reproduction is hard

TABLE 2-3

| Sample No. | Second Absorbent Layer $A_2$ composition | n | k | First Absorbent Layer $A_1$ composition | n | k | C/N (dB) $M_s = 0.173$ μm | $M_s = 0.160$ μm | $M_s = 0.147$ μm | $M_s = 0.138$ μm |
|---|---|---|---|---|---|---|---|---|---|---|
| 221 | $CeO_2 + Al_2O_3$ | 2.4 | 0.06 | $CeO_2 + Al_2O_3$ | 2.4 | 0.06 | 51.0 | 47.5 | 41.8 | 39.1 |
| 222 | $CeO_2$ | 2.4 | 0.1 | AlN | 2.1 | 0.1 | 50.8 | 47.3 | 42.1 | 35.3 |

AlN was formed by reactive sputtering of Ar and $N_2$ and the ratio of Ar and $N_2$ was changed to form a film having an extinction coefficient k varied. n represents a refractive index. In this measurement, when the C/N is equal to or greater than 40 (dB) in case of the mark length $M_S$ equal to or longer than 0.14 μm and when the C/N is equal to or greater than 33 (dB) in case of the mark length $M_S$ shorter than 0.14 μm, the medium can be used by a signal processing technique. From the foregoing, it can be supposed that the preferable range of the extinction coefficient k is set to $0.06 \leq k \leq 1.0$. From the Table 2-2 and the Table 2-3, moreover, it is also apparent that the effect of the invention does not depend on the constitutive element of the absorbent layer.

Third Example

For samples No. 202 and No. 204 fabricated in the second example, $XE_{+30}$ and a reproducing durability were measured in the same manner as in the first example. A result is shown in Table 3.

TABLE 3

| Sample No. | Second Absorbent Layer $A_2$ composition | k | First Absorbent Layer $A_1$ composition | k | $XE_{+30}$ (dB) G | L | Reproducing Durability (number of times) |
|---|---|---|---|---|---|---|---|
| 202 | $CeO_2$ | 0.1 | $CeO_2$ | 0.1 | −4.6 | −3.1 | 3000 |
| 204 (compare) | $Al_2O_3$ | 0 | $Al_2O_3$ | 0 | −6.1 | −4.9 | 300 |

From the Table 3, the effect of the invention is apparent.

In the first embodiment of the invention, the absorbent layer is provided between the recording layer and the radiating layer. Consequently, the reproducing durability can be enhanced and the cross erase can be reduced. In the second embodiment of the invention, the absorbent layer is provided on this side of the recording layer as seen from the recording/reproducing light incidence side. Consequently, the jitter can be reduced when the minimum mark length is small.

What is claimed is:

1. An optical recording medium comprising:
    a recording layer;
    an absorbent layer; and
    a radiating layer,
    wherein the recording layer, the absorbent layer and the radiating layer is provided in this order from a recording/reproducing light incidence side,
    wherein recording/reproduction is carried out on a condition that an extinction coefficient k of the absorbent layer is k>0 in a wavelength of recording/reproducing light,
    wherein a recording track pitch PT is set to PT≦0.35 μm.

2. The optical recording medium according to claim 1, further comprising a second absorbent layer provided on a side of the recording layer closest to a recording/reproducing light incidence side,
    wherein an extinction coefficient k of the second absorbent layer is k>0 in a wavelength of recording/reproducing light,
    wherein a signal including a minimum mark having a mark length Ms of Ms≦0.17 μm is recorded.

3. The optical recording medium according to claim 1, wherein the extinction coefficient k of the absorbent layer is $0.06 \leq k \leq 1.0$.

4. The optical recording medium according to claim 1, wherein the extinction coefficient k of the absorbent layer is $0.06 \leq k \leq 1.0$.

5. The optical recording medium according to claim 2, wherein the extinction coefficient k of the absorbent layer is $0.06 \leq k \leq 1.0$.

6. An optical recording medium comprising:

an absorbent layer; and a recording layer having at least one recording mark having a mark length $M_s$ of $M_s \leq 0.17 \mu m$, wherein the absorbent layer and the recording layer is provided in this order from a recording/reproducing light incidence side, wherein an extinction coefficient k of the absorbent layer is $k>0$ in a wavelength of recording/reproducing light.

7. The optical recording medium according to claim 6, wherein the extinction coefficient k of the absorbent layer is $0.06 \leq k \leq 1.0$.

8. A method of recording on an optical recording medium, the method comprising:

recording on the medium using an irradiating optical system having a wavelength $\lambda$ of recording light and a numerical aperture of the optical recording system satisfying the relationship $\lambda/NA \leq 680$ nm, wherein the optical recording medium comprises a recording layer, an absorbent layer, an irradiating layer, the absorbent layer and radiating layer provided in this order from a recording light incident side, and an extinction coefficient k of the absorbent layer is $k \leq 0$ in a wavelength of the recording reproducing light.

* * * * *